US011431557B1

(12) United States Patent
Shrestha et al.

(10) Patent No.: US 11,431,557 B1
(45) Date of Patent: Aug. 30, 2022

(54) SYSTEM FOR ENTERPRISE EVENT ANALYSIS

(71) Applicant: Dell Products L.P., Round Rock, TX (US)

(72) Inventors: Saurav Shrestha, Round Rock, TX (US); Carlin Mendonca, Austin, TX (US); Margaret Patton, Austin, TX (US); Jeffrey M. Lairsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/228,887

(22) Filed: Apr. 13, 2021

(51) Int. Cl.
*H04L 41/069* (2022.01)
*H04L 41/0686* (2022.01)
*H04L 41/22* (2022.01)
*H04L 43/04* (2022.01)

(52) U.S. Cl.
CPC ........ *H04L 41/069* (2013.01); *H04L 41/0686* (2013.01); *H04L 43/04* (2013.01); *H04L 41/22* (2013.01)

(58) Field of Classification Search
CPC ... H04L 41/069; H04L 41/0686; H04L 43/04; H04L 41/22; G06N 5/046; G06F 17/3053; G06F 17/30958
See application file for complete search history.

(56) References Cited

U.S. PATENT DOCUMENTS

| | | |
|---|---|---|
| 9,148,349 B1 | 9/2015 | Burr et al. |
| 9,471,594 B1 | 10/2016 | Schnegelberger |
| 9,785,497 B1 * | 10/2017 | Cook .................. G06F 11/0709 |
| 10,530,935 B1 | 1/2020 | Britt et al. |
| 10,616,072 B1 | 4/2020 | Lo et al. |
| 11,074,730 B1 | 7/2021 | Nunez |
| 2006/0010497 A1 | 1/2006 | O'Brien |
| 2006/0129670 A1 | 6/2006 | Mayer |
| 2010/0313145 A1 | 12/2010 | Dillenberger et al. |

(Continued)

OTHER PUBLICATIONS

Daniel McDuff et al., AFFDEX SDK: A Cross-Platform Real-Time Multi-Face Expression Recognition Toolkit, Publication: CHI EA '16: Proceedings of the 2016 CHI Conference Extended Abstracts on Human Factors in Computing Systems, pp. 3723-3726, May 2016, https://doi.org/10.1145/2851581.2890247.

(Continued)

*Primary Examiner* — Muhammad Raza
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: monitoring data center assets within a data center; identifying an issue within the data center, the issue being associated with an operational situation associated with a particular component of the data center; notifying an administrator of the issue within the data center; tracking administrator reactions based upon the notifying; identifying a remediation task, the remediation task being designed to address the issue within the data center, the identifying being based upon at least some of the administrator reactions; and, prioritizing the remediation task based upon the administrator reactions to the notifying.

11 Claims, 12 Drawing Sheets

(56) References Cited

U.S. PATENT DOCUMENTS

| | | |
|---|---|---|
| 2011/0160987 A1 | 6/2011 | Wu et al. |
| 2011/0258143 A1 | 10/2011 | Hilkemeyer et al. |
| 2012/0249588 A1 | 10/2012 | Tison et al. |
| 2013/0031202 A1 | 1/2013 | Mick et al. |
| 2014/0006762 A1 | 1/2014 | Bittner et al. |
| 2017/0034200 A1* | 2/2017 | Costin ............... G06F 16/24578 |
| 2017/0091607 A1 | 3/2017 | Emeis et al. |
| 2017/0098087 A1 | 4/2017 | Li |
| 2017/0269617 A1 | 9/2017 | Daoud et al. |
| 2017/0269983 A1 | 9/2017 | Liu et al. |
| 2017/0330096 A1* | 11/2017 | Das Gupta .......... G06F 11/0769 |
| 2018/0032736 A1 | 2/2018 | Inagaki et al. |
| 2018/0108022 A1* | 4/2018 | Bandera ........... G06Q 10/06316 |
| 2018/0285750 A1 | 10/2018 | Purushothaman et al. |
| 2019/0073276 A1 | 3/2019 | Yuen et al. |
| 2019/0158366 A1* | 5/2019 | Higgins ........... G06Q 10/06313 |
| 2019/0236844 A1 | 8/2019 | Balasian et al. |
| 2020/0050861 A1* | 2/2020 | Wexler ............... G06K 9/00288 |
| 2020/0117529 A1 | 4/2020 | Qiao et al. |
| 2020/0117898 A1 | 4/2020 | Tian et al. |
| 2020/0167712 A1 | 5/2020 | Stracquatanio et al. |
| 2020/0169509 A1 | 5/2020 | Tigli |
| 2020/0175165 A1 | 6/2020 | Murphy et al. |
| 2020/0250430 A1 | 8/2020 | Kishore et al. |
| 2020/0250863 A1 | 8/2020 | Shetty et al. |
| 2020/0252276 A1 | 8/2020 | Lairsey et al. |
| 2020/0253079 A1 | 8/2020 | Lairsey et al. |
| 2020/0278901 A1 | 9/2020 | Singh et al. |
| 2020/0329214 A1 | 10/2020 | Ahn et al. |
| 2021/0019423 A1 | 1/2021 | DuBois et al. |
| 2021/0084119 A1 | 3/2021 | Sheikh |
| 2021/0097058 A1 | 4/2021 | Skiles et al. |
| 2021/0112145 A1 | 4/2021 | Monga et al. |
| 2021/0397182 A1 | 12/2021 | Dundorf et al. |
| 2022/0070050 A1 | 3/2022 | D'Ippolito et al. |
| 2022/0156162 A1 | 5/2022 | Reyes et al. |

OTHER PUBLICATIONS

Brittany Herr et al., Analyzing distributed trace data, Pinterest Engineering Blog, Sep. 29, 2017, https://medium.com/pinterest-engineering/analyzing-distributed-trace-data-6aae58919949.

* cited by examiner

SYSTEM FOR ENTERPRISE EVENT ANALYSIS

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: monitoring data center assets within a data center; identifying an issue within the data center, the issue being associated with an operational situation associated with a particular component of the data center; notifying an administrator of the issue within the data center; tracking administrator reactions based upon the notifying; identifying a remediation task, the remediation task being designed to address the issue within the data center, the identifying being based upon at least some of the administrator reactions; and, prioritizing the remediation task based upon the administrator reactions to the notifying.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring data center assets within a data center; identifying an issue within the data center, the issue being associated with an operational situation associated with a particular component of the data center; notifying an administrator of the issue within the data center; tracking administrator reactions based upon the notifying; identifying a remediation task, the remediation task being designed to address the issue within the data center, the identifying being based upon at least some of the administrator reactions; and, prioritizing the remediation task based upon the administrator reactions to the notifying.

In another embodiment the invention relates to a computer-readable storage medium embodying computer program code, the computer program code comprising computer executable instructions configured for: monitoring data center assets within a data center; identifying an issue within the data center, the issue being associated with an operational situation associated with a particular component of the data center; notifying an administrator of the issue within the data center; tracking administrator reactions based upon the notifying; identifying a remediation task, the remediation task being designed to address the issue within the data center, the identifying being based upon at least some of the administrator reactions; and, prioritizing the remediation task based upon the administrator reactions to the notifying.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
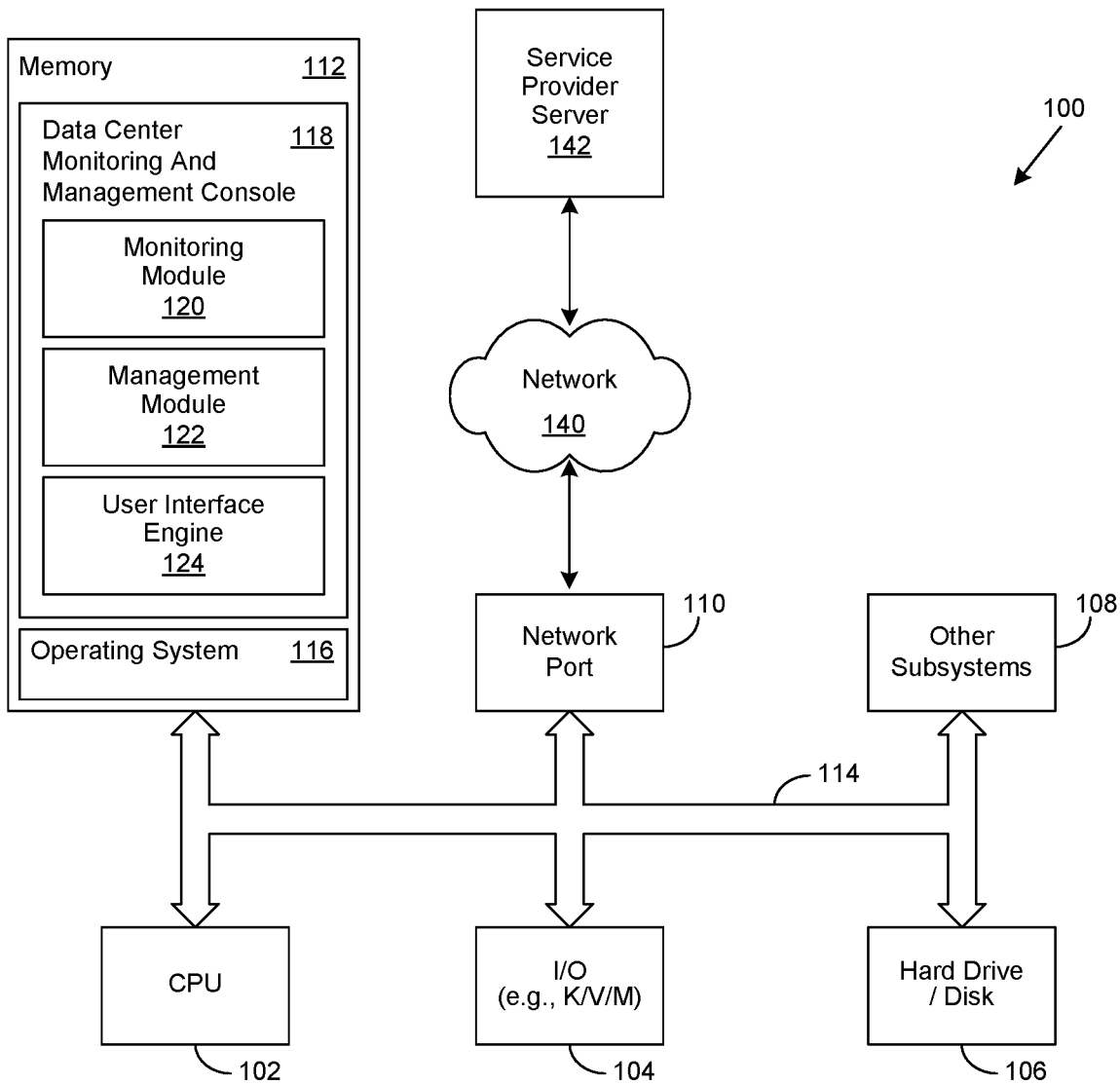
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Various aspects of the invention reflect an appreciation that data center system administrators, beyond their day-to-day monitoring and management duties, often have the additional responsibility of remediating certain data center issues. Certain aspects of the invention likewise reflect an appreciation that the complexity of such remediation responsibilities generally grows in proportion to the number of data center assets that are being monitored and managed. Likewise, certain aspects of the invention reflect an appreciation that quickly remediating data center issues, regardless of how simple or complex they may be, will likely lead to higher quality of service levels and user satisfaction.

Certain aspects of the invention reflect an appreciation that it is not uncommon for a system's User Interface (UI) to be static, generalized, and oriented to the most typical needs of its target user. Certain aspects of the invention likewise reflect an appreciation that the hierarchy of a UI is commonly structured to facilitate typical user patterns and workflows, which in turn are generally based upon precedent, trends, and user testing. However, certain aspects of the invention likewise reflect an appreciation that while such approaches to UI design may be well suited for remediating common data center issues, they may prove to be a hindrance when responding to those that may be infrequent, yet critical.

Certain aspects of the invention reflect an appreciation that a workflow corresponding to a particular data center remediation operation, described in greater detail herein, is likewise oriented to the most typical needs of a data center administrator tasked with remediating an associated data center issue. Likewise, certain aspects of the invention reflect an appreciation that such a generalize workflow may prove to be cumbersome and overly detailed for an experienced data center administrator, yet not provide sufficient information and guidance for an administrator that is less experienced. Accordingly, certain aspects of the invention reflect an appreciation that it may be advantageous to an organization to be able to adjust workflows and UIs associated with a data center remediation operation such that it is pertinent to a particular data center issue and the data center personnel tasked with its remediation. Various aspects of the invention likewise reflect an appreciation that the implementation of such workflow and UI adjustments will likely will likely result in shorter data center issue remediation intervals, and by extension, lead to higher quality of service levels and user satisfaction.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
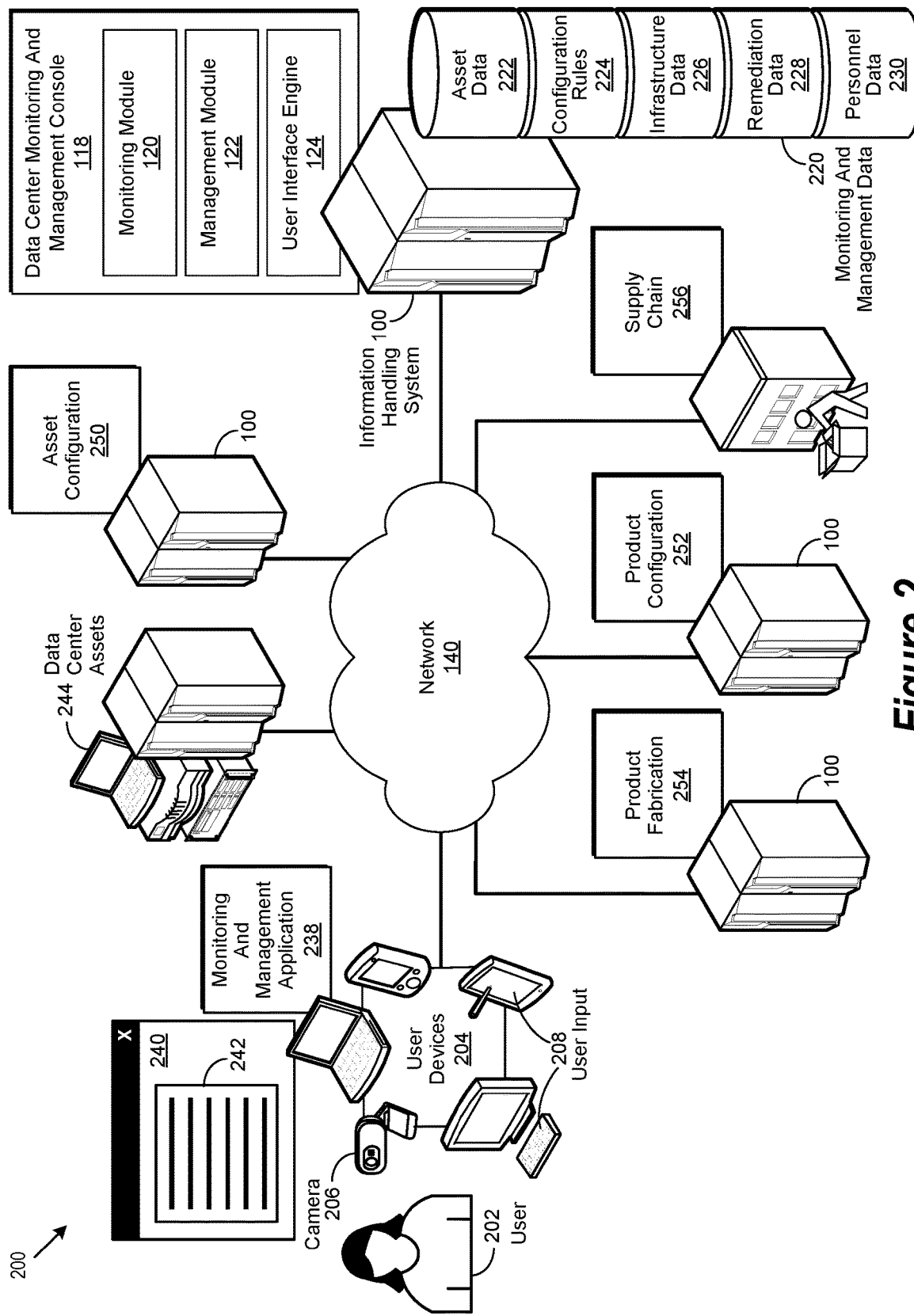
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the selection of such parameters is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring task may include an affective computing operation. Skilled practitioners of the art will be familiar with the concept of affective computing, which in common use typically refers to the study and development of systems and devices that can recognize, interpret, process, and simulate human affects. Those of skill in the art will likewise be aware that human affect typically refers to the mental feeling within a human body that underlies all emotional experience. Accordingly, as used herein, an affective computing operation broadly refers to any task, function, operation, procedure, or process performed, directly or indirectly, within a data center monitoring and management environment 200 to determine the emotional state of an associated user 202, such as a data center administrator, operator, technician, and so forth.

In various embodiments, an affective computing operation may be implemented to use certain emotional information, as described in greater detail herein, to determine the emotional state of a user 202. As used herein, emotional information broadly refers to any information directly, or indirectly, associated with a user 202 that can be used in the performance of an affective computing operation to determine the user's 202 emotional state. Examples of such emotional information include certain biometric data associated with a user's 202 facial expressions, microexpressions, changes in facial color, eye movement, pupil dilation, and so forth. Other examples of emotional information include tone or pitch of voice, tempo of speech, skin temperature, body gestures, and body language. Yet other examples of emotional information include the speed, cadence, and force exhibited by a user 202 when providing input 208 to a manual input device, such as a keyboard or touchscreen.

Yet still other examples of emotional information include information associated with a user's 202 navigation of a user interface (UI) hierarchy, the speed at which such navigation occurs, whether such navigation is erratic, and the amount of time spent viewing certain elements of a UI hierarchy. In certain embodiments, the emotional information may be collected and provided by an input device, such as a camera 206, a microphone, keyboard, mouse, touchpad, touchscreen, and other sensors, as described in greater detail herein. Skilled practitioners of the art will recognize that many such examples of emotional information, and the method by which they can be collected and provided, are possible. Accordingly, the foregoing is not intended to limit the spirit, scope, or intent of the invention.

In certain embodiments, the affective computing operation may be performed to determine the emotional state of a user 202 at a particular point in time. In certain embodiments, the affective computing operation may be performed to correlate the emotional state of a particular user 202 with the occurrence of an event at a particular time and place, and the stage of a particular workflow being performed by the user 202, or a combination thereof. As used herein, an event broadly refers to a directly, or indirectly, observable action that may occur within the data center monitoring and management environment 200. In certain embodiments, the observable action may be directly, or indirectly, associated with a user 202, a user device 204, a data center asset 244, the data center monitoring and management console 118, the data center monitoring and management application 238, or other components of the data center monitoring and management environment 200, or a combination thereof, as described in greater detail herein.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, and a user interface (UI) engine 124, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload. In certain embodiments, the data center asset data 224 may include information associated with data center asset 244 types, quantities, locations, use types, optimization types, workloads, performance, support information, and cost factors, or a combination thereof, as described in greater detail herein. In certain embodiments, the data center asset data 224 may include information associated with data center asset 244 utilization patterns, likewise described in greater detail herein.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. Those of skill in the art will recognize that many such examples of data center remediation data 230 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In various embodiments, the camera 206 may be implemented to capture and provide certain emotional information, described in greater detail herein, that is visually-oriented. In certain embodiments, the visually-oriented emotional information may include information associated with a user's 202 facial expressions, microexpressions, changes in facial color, eye movement, pupil dilation, body gestures, and body language. Skilled practitioners of the art will be familiar with the concept of a microexpression, which in common use typically refers to a facial expression that only lasts for a short moment. In general, a microexpression is the result of a voluntary and involuntary emotional response that occurs simultaneously, and conflicts, with another. More particularly, a microexpression typically reflects a person's true emotions for a brief period of time (e.g., less than half a second), followed by a facial expression that conveys a false emotional reaction for a longer period of time (e.g., 4.0 to 9.5 seconds).

Those of skill in the art will be aware that microexpressions express what is commonly considered the seven universal emotions, which are disgust, anger, fear, sadness, happiness, contempt, and surprise. Other emotions that may be expressed by a microexpresssion include amusement, embarrassment, anxiety, guilt, pride, relief, contentment, pleasure, and shame. In certain embodiments, one or more such emotions may be consolidated into a smaller number of categories. In certain embodiments, such categories may be renamed, such as "happy," "neutral," "worried," and "angry/frustrated." In these embodiments, the emotions selected to be consolidated into a smaller number of categories, and the method by which those categories are referenced, is a matter of design choice.

In practice, microexpressions are so fleeting that it is difficult for another human to observe them. Accordingly, microexpressions are typically captured by a camera 206, such as a video camera 206. The visual information captured by the camera 206 can then be analyzed to determine the actual emotional state of a user 202 at a particular time and place, and in relation to a particular set of circumstances. In certain embodiments, visually-oriented emotional information may be captured by the camera 206 and conveyed to an associated user device 204. In certain embodiments, the user device 204 may be implemented to provide the visually-oriented emotional information to the data center monitoring and management console 118, or the data center monitoring and management application 238, or both for processing. In certain embodiments, the data center monitoring and management console 118 and the data center monitoring and management application 238, individually or in combination, may be implemented to use the visually-oriented emotional information to perform an affective computing operation, described in greater detail herein.

In various embodiments, the visually-oriented emotional information may be used in the performance of an affective computing operation to identify the facial expression of a user 202 at a particular point in time. In certain of these embodiments, the facial expression of the user 202 may be identified and analyzed through the use of the Facial Action Coding System (FACS), familiar to skilled practitioners of the art. In certain embodiments, other known approaches for the identification and analysis of facial expressions, such as the Micro Expression Training Tool (METT) and Subtle Expression Training Tool (SETT), may be used in the performance of an affective computing operation.

In certain embodiments, the affective computing operation may be performed to determine the actual emotional state of a user 202 by analyzing a microexpression they may exhibit as they view certain content, such as a data center issue alert, or perform an associated data center remediation operation, or both, as described in greater detail herein. As an example, a data center administrator may be scrolling through a general alert log when they happen to notice an alert associated with a particular data center issue, such as the temperature of a group of servers exceeding their operational parameters. In this example, the microexpression initially exhibited by the administrator may indicate surprise, fear, and concern, quickly followed by exhibiting a facial expression that indicates disgust, contempt, and indifference. To continue the example, the administrator's microexpression may indicate their true emotional state is one of being surprised by the alert, fear that they may not be able to remediate the issue quickly, and concern about the consequences. Likewise, the administrator's facial expression may indicate a feigned emotional state of disgust that they have to deal with the overheating issue, contempt that it is not that difficult to remediate, and indifference to the threat it may pose.

To continue the example further, the administrator's microexpression, however fleeting, provides an indication of their true emotional state, despite what their subsequent facial expression may indicate. Accordingly, the microexpression may likewise indicate that the administrator may need assistance, either from other data center personnel, or being provided other resources, such as relevant diagnostics or documentation, in remediating the overheating issue. Likewise, the microexpression may indicate that the overheating issue needs to be escalated, or prioritized, over other data center issues being reviewed by the administrator.

In certain embodiments, the emotional information captured by the camera 206 may be in the form of one or more individual digital images. In various embodiments, the emotional information captured by the camera 206 may be in the form of a video recording. In certain of these embodiments, the video recording may be provided to the data center monitoring and management console 118, or the data center monitoring and management application 238, or both, in the form of a continuous sequence of video frames. In certain embodiments, the continuous sequence of video frames may be collected by the data center monitoring and management console 118, or the data center monitoring and management application 238, or both, to provide full-motion video when played back. In certain embodiments, the video recording images may be provided to the data center monitoring and management console 118, or the data center monitoring and management application 238, or both, in the form of streaming media, familiar to those of skill in the art.

In various embodiments, certain emotional information associated with a user's 202 gestures may be collected. In certain embodiments, such user 202 gestures may include key strokes on a keypad, a cursor movement, a mouse movement or click, a finger swipe, tap, or other hand gesture, or some combination thereof. In certain embodiments, the emotional information associated with a user's 202 gestures may likewise include the cadence of the user's 202 keystrokes, the motion, force and duration of a hand or finger gesture, or some combination thereof. In various embodiments, the user 202 gestures may include certain audio or verbal commands uttered by the user. In certain embodiments, such audio or verbal commands may be uttered when interacting with a particular system, such as the data center monitoring and management console 118 or the data center monitoring and management application 238.

Various embodiments of the invention reflect an appreciation that certain user 202 gestures may provide emotional information that is useful in the performance of an affective computing operation to determine a user's 202 emotional state. As an example, a user 202 entering text at a quick pace with a rhythmic cadence may indicate intense focus. Likewise, a user 202 that is intermittently entering text with forceful keystrokes may indicate the user 202 is in an agitated state. As another example, the user 202 may intermittently enter text somewhat slowly, which may indicate being in a thoughtful or reflective state of mind. As yet another example, the user 202 may enter text with a light touch with an uneven cadence, which may indicate the user is hesitant or unsure of their actions.

Various embodiments of the invention likewise reflect an appreciation that while certain user 202 gestures may provide an indications of the emotional state of a particular user 202, they may not provide the reason for the user 202 to be in that emotional state. Likewise, various embodiments of the invention include an appreciation that certain user 202 gestures 620 may be typical for a particular user 202. As an example, aggressive, forceful keystrokes may indicate normal behavior for a particular user when in the process of remediating a data center issue. In various embodiments, certain emotional information associated with a user 202 may be correlated with the occurrence of certain data center events, one or more steps of a workflow being performed by the user 202, and other contextual information, as described in greater detail herein. In these embodiments, the determination of under what circumstances the emotional information associated with a particular user 202 is captured for use in an associated affective computing operation is a matter of design choice.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204. such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
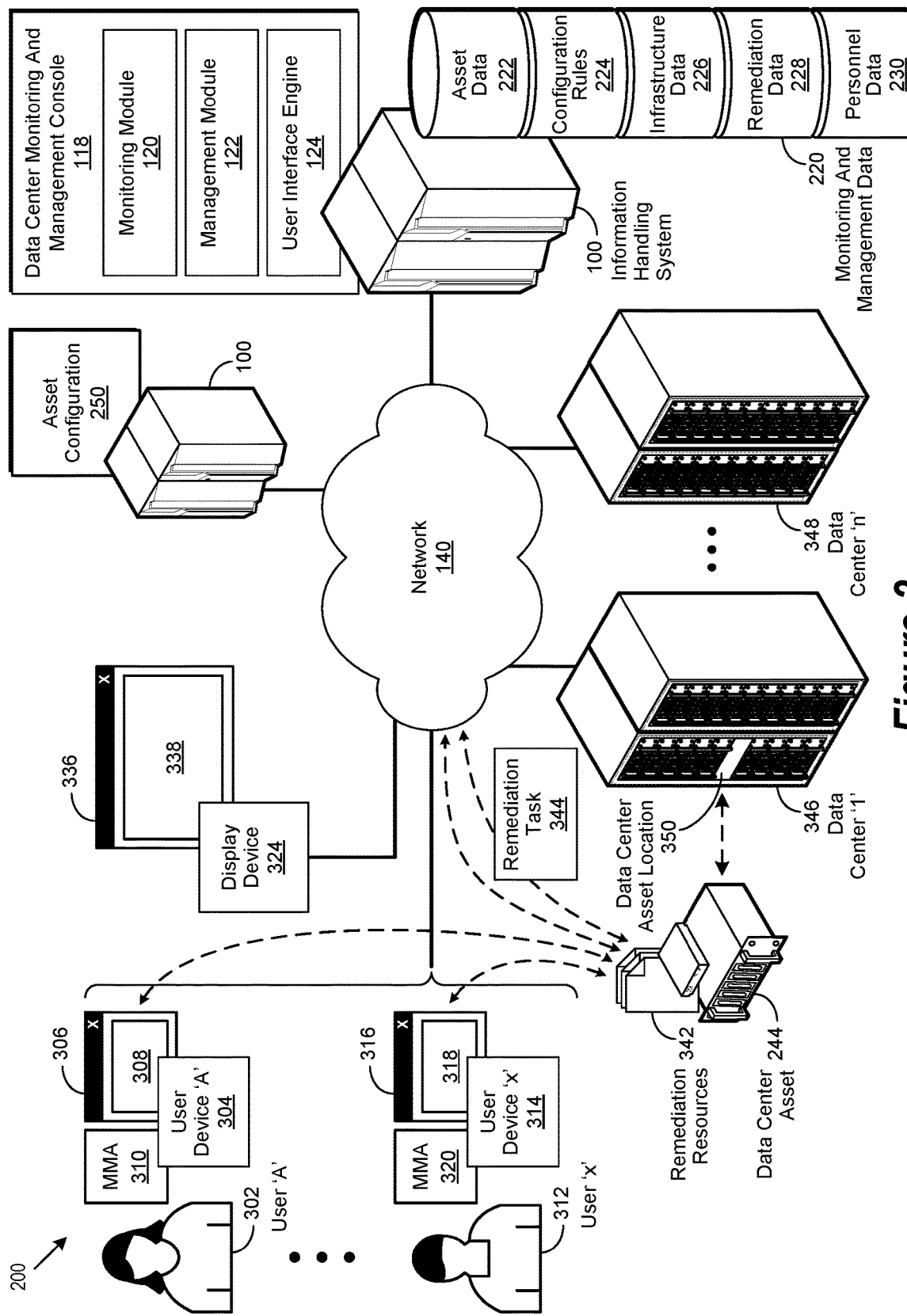
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation the that is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, a data center monitoring and management operation may include one or more data center issue analysis and remediation operations. As used herein, a data center issue analysis and remediation operation broadly refers to any task, function, procedure, or process performed, directly or indirectly, within a data center monitoring and management environment 200 to analyze a particular data center issue, and then use the resulting analysis to facilitate the performance of an associated data center remediation operation. In various embodiments, the analysis of the data center issue may include the performance of an affective computing operation to determine the emotional state of a data center administrator, or other data center personnel, associated with the performance of the data center remediation operation. In various embodiments, the emotional state of the data center administrator, or other data center personnel, may be used, as described in greater detail herein, to facilitate the performance of the data center remediation operation.

In certain of these embodiments, ongoing data center monitoring operations, described in greater detail herein, may be performed to detect certain data center issue alerts, likewise described in greater detail herein. In various embodiments, detection of such an alert may result in data center issue alert description information, data center asset 244 telemetry, configuration, firmware, and other reference information, and information related to with the performance of certain associated data center actions being collected.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In certain embodiments, a preliminary analysis of a detected alert's associated data center issue may be performed to assign it a data center issue priority level and a remediation difficulty level. In certain embodiments, the prioritization and remediation difficulty levels of a particular data center issue may be established by respectively assigning a data center issue baseline priority level value and a corresponding remediation difficulty level value, such as '1,' '2,' '3,' '4,' and '5.' As an example, a particular data center issue may be assigned a priority level value of '1,' which is the highest priority, and a remediation difficulty level value of '5,' which is the lowest difficulty. In these embodiments, the method by which the baseline prioritization level and remediation difficulty level of a data center issue is determined, the method by which such prioritization and difficulty is characterized and notated, and the method by which it is associated with a particular data center issue, is a matter of design choice.

In certain embodiments, the data center issue alert, the previously-collected data center issue detail information, and its assigned baseline priority level value, may then be presented to a particular user 'A' 302 through 'x' 312, such as a data center administrator. In certain embodiments, the data center issue alert, the previously-collected data center issue detail information, and its assigned baseline priority level value, may then be presented to the data center administrator within UI windows 306 through 316. or 336. In certain embodiments, emotional information associated with the reaction of the data center administrator when viewing the presented information may be captured and processed, as described in greater detail herein, to determine their actual emotional state.

In various embodiments, a comparison may be performed between the emotional state of the current data center administrator and the emotional states of certain other data center administrators at the time they received the same data center issue alert, associated data center issue details, and its corresponding data center issue priority level value. In various embodiments, one or more of the emotional states may be selected and then used to generate an associated priority weighting value for the data center issue. In certain embodiments, the resulting data center issue priority weighting value may be applied to the baseline priority level value of the data center issue to adjust its prioritization.

In certain embodiments, application of the data center issue priority weighting value may escalate the prioritization of the data center issue, de-escalate its prioritization, or have no effect at all on its prioritization. In these embodiments, the method by which the emotional state of a particular user 'A' 302 through 'x' 312 may be determined, how it may be used to determine an associated data center issue priority weighting value, how the priority weighting value may be characterized (e.g., '+1', '+10%', "de-escalate one level", etc.), and how it may be applied to an associated baseline priority level value of a particular data center issue, is a matter of design choice.

In certain embodiments, according to its adjusted priority level value and its remediation difficulty level value, it may be decided to prioritize the remediation of a particular data center issue over other data center issues. In certain embodiments, it may be decided to remediate a particular data center issue at the time its priority level value has been adjusted. As an example, a data center issue with a baseline priority level value of '4' may be escalated to an adjusted priority level value of '5' as a result of the application of a priority weighting value generated as a result of the reaction of a data center administrator when viewing details of the data center issue. To continue the example, the data center administrator may elect to assume responsibility for remediating the data center issue based upon its adjusted priority level value.

In various embodiments, once the data center issue priority level value and remediation difficulty level value has been associated with its corresponding data center issue, it may then be added to a ranked list of data center issues to be remediated. In certain of these embodiments, individual data center issues may be ranked according to their corresponding data center issue priority level value, their respective remediation difficulty level value, or a combination of the two. In certain embodiments, a particular data center issue may then be selected from the ranked list for remediation, as described in greater detail herein.

In certain embodiments, the data center issue selected for remediation may then be compared to the same, or substantively similar, data center issues that have been successfully remediated in the past to determine possible data center remediation operations to perform. In various embodiments, information associated with such similar, or substantively similar, data center issues, and the data center remediation operation used to successfully remediate them, may be stored in the repository of data center remediation data 228. In certain of these embodiments, the data center remediation operation used to successfully remediate the same, or substantively similar, data center issues in the past may be presented in ranked order of their respective efficacy. In certain embodiments, the ranked list of data center remediation operations may be presented within a particular UI window 306 through 316, or 336.

As an example, those data center remediation operations that are more likely to remediate a particular data center issue may have a higher ranking than those that are less likely to. In certain embodiments, the emotional state of the administrator may be used to determine which data center remediation operations are presented, or the order in which they are presented, or both. In these embodiments, the method by which the efficacy of such data center remediation operations are determined, the method by which they are ranked, the criteria by which the ranking is determined, and how the emotional state of the administrator is used to determine which data center operations are presented, is a matter of design choice.

In certain embodiments, one or more such data center remediation operations may then be selected. In various embodiments, it may be determined that certain of the data center remediation operations presented for selection may be able to be performed automatically. In certain of these embodiments, those data center remediation operations that may be performed automatically may be respectively presented to a data center administrator, such as user 'A' 302 through 'x' 312, within UI 306 through 316, or 336, in a form that they may be initiated through the use of a user gesture, such as a mouse click or a finger tap on a command button.

In various embodiments, it may be determined that certain of the data center remediation operations may not be able to be performed automatically. In certain of these embodiments, a determination may be made regarding relevant data center personnel and remediation resources that may be pertinent to their performance. To continue a previous example, a server may have an internal fan that is beginning to fail, and as a result, its operational temperature is beginning to reach an unacceptable level. In this example, the data center remediation operation selected to be performed may involve replacement of the fan. Accordingly, it may be determined that who is needed to perform the data center remediation operation is any data center personnel that is knowledgeable of how to replace the fan, regardless of whether they have done so in the past, or more particularly, have done so for that particular type or model of server. Likewise, it may be determined that what is needed to perform the data center remediation operation is a suitable replacement fan, documentation for the fan and server, and step-by-step instructions on how to replace the fan in that particular server.

In various embodiments, it may be determined that a data center administrator attempting to remediate a particular data center issue may not possess the qualifications typically associated with performing a particular data center remediation operation they have selected. In various embodiments, a determination may be made regarding the most relevant data center personnel available to assist in performing the selected data center remediation operation. In certain of these embodiments, the information used to make such an availability determination may be stored in the repositories of data center asset data 222, configuration rules 224, infrastructure data 226, remediation data 228, or personnel data 230, or a combination thereof.

In certain embodiments, a ranked list of candidate data center personnel to perform the selected data center remediation operation may be generated. In certain embodiments, the list of candidate data center personnel may be ranked according to particular skills, certifications, knowledge, experience, and so forth, they may individually possess that may be pertinent to performing the selected data center remediation operation. In certain embodiments, one or more of the candidate data center personnel may be selected to assist the data center administrator in performing one or more data center remediation operations.

In various embodiments, the list of candidate data center personnel may additionally be ranked according to each individual candidate's current workloads, their currently assigned responsibilities, their success rate in remediating a particular type or class of data center issue, the number of such data center issues they have successfully remediated in the past, the average time it may have taken them to successfully remediate the issue, their physical location, the priority level and remediation difficulty level of the data center issue, and so forth. In various embodiments, the data center monitoring and management console 118 may be implemented to track the physical location of certain data center personnel. In various embodiments, certain Global Positioning System (GPS) approaches familiar to those of skill in the art may be used to perform such tracking.

Various embodiments of the invention reflect an appreciation that an organization may desire broadening the knowledge, capabilities, and expertise of certain less-experienced data center personnel involved in the remediation of data center issues. Accordingly, in certain embodiments, an organization may elect to have the most minimally qualified data center personnel remediate a particular data center issue, based upon its data center issue priority level value, or its remediation difficulty value, or a combination of the two. As an example, a particular data center issue may have a data center issue priority level value of '1', indicating that it is of low priority, yet it has a remediation difficulty level value of '5', indicating that it may be very difficult or complicated to remediate. In this example, the data center issue may be considered to be an opportunity for a less-experienced data center administrator or technician to gain knowledge and expertise in resolving a difficult or complicated data center issue without incurring significant risk if its remediation takes longer than anticipated.

As another example, a particular data center issue may have a data center issue priority level value of '5', indicating that it is of very high priority, yet it has a remediation difficulty value of '1', indicating that it may be relatively simple to remediate. In this example, the data center issue may be considered to be inappropriate for a less-experienced data center administrator or technician to remediate, as its high priority may indicate that the data center may incur significant risk if it takes too long to remediate. Accordingly, it may make sense for a more experienced data center administrator or technician to remediate the issue to reduce data center's risk, even though its remediation difficulty may be low.

In certain embodiments, one or more data center personnel may be selected from the ranked list of candidate data center personnel to perform, or assist the data center administrator in performing, the selected data center remediation operation. In these embodiments, the method by which the one or more personnel is selected from the ranked list of candidate data center personnel is a matter of design choice. In various embodiments, certain rules-based, pattern matching, or machine learning approaches known to those of skill in the art may be used to make the selection. In these embodiments, the rules-based, pattern matching, or machine learning approaches, or a combination thereof, used to make the selection is a matter of design choice.

In certain embodiments, the availability of the selected data center personnel may next be determined, and if they are not available to assist in the performance of the data center remediation operation, then a different candidate is selected, as before. In these embodiments, the selection process may be repeated until the availability of the selected data center personnel has been confirmed. In various embodiments, the data center monitoring and management console 118 may be implemented to identify certain remediation documentation, data center asset files, and other remediation resources 342 needed to perform the data center remediation operation once it has been determined that selected data center personnel are available to perform it. As used herein, a remediation resource broadly refers to any data center asset 244, whether it is tangible or intangible, as described in greater detail herein, that can be used in the performance of a data center remediation operation, likewise described in greater detail herein.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center personnel selected to assist in remediating the data center issue may then receive the remediation task 344 assignment notification. In certain embodiments, data center personnel receiving such a remediation task 344 assignment notification may then review its associated remediation task 344 assignment, review any associated data center remediation operation notes, and retrieve any associated remediation resources 342, including remediation documentation, needed to perform the remediation task 344.

In various embodiments, remediation documentation pertinent to the data center personnel assigned to the remediation task 344 may not be available. In certain of these embodiments, a reference data center asset 244 may be selected to begin data center remediation operations to remediate the data center asset 244 associated with the previously-selected data center issue. As used herein, a reference data center asset 244 broadly refers to a properly operating data center asset 244 that most closely matches the configuration, functionality, and workload assignment, or a combination thereof, of the data center asset 244 associated with the previously-selected data center issue. In certain embodiments, operational information related to the data center asset 244 associated with the previously-selected data center issue may be compared to that of the selected reference data center asset 244.

As an example, the processing throughput of a server having a particular hardware and software configuration, and a particular assigned workload, may have decreased by 40% in the last 24 hours. In this example, a different server, having the same, or substantively the same, hardware and software configuration, and assigned workload, may be selected as a reference data center asset 244. To continue the example, the assigned data center personnel may first run certain diagnostic routines to verify that the hardware configuration of the two servers not only match one another, but that the their respective hardware components, such as processors, memory, storage, network ports, and so forth, are operating properly. To further continue the example, it may be determined that the hardware configuration of the two servers not only matches one another, but are both operating properly.

Accordingly, the data center personnel may elect to compare the software configuration of the two servers, and as a result, discovers that both servers have recently had their OS updated to the most recent version. However, the reference server has had a particular hardware driver updated at the same time, while the server associated with the data center issue has not. In an attempt to remediate the data center issue, the data center personnel may update the out-of-date driver on the server associated with the data center issue. Thereafter, the data center personnel may measure the processing throughput of the server once the hardware driver has been updated to verify that the server is performing as expected.

In various embodiments, details of the selected data center remediation operation, and the emotional state of the administrator, is captured and collected at each step of the data center remediation operation as it is performed. In certain of these embodiments, the steps of the data center remediation operation may be captured and collected manually by the data center personnel who performed them, or captured automatically by the data center monitoring and management console 118, or the data center monitoring and management application 310 through 320, or a combination thereof.

In certain embodiments, the workflow of the data center remediation operation, or its UI, or both, may be adjusted according to the emotional state of the data administrator, or other data center personnel, or both, who may be performing it. As an example, the emotional state of a less experienced data center administrator may change from "confident" to "confused" at a particular workflow step of a data center remediation operation being performed to remediate an associated data center issue. In this example, the workflow of the data center remediation operation may be adjusted to include more incremental steps. Likewise, the UI for the data center remediation operation may be adjusted to include additional explanations for each of the more incremental workflow steps.

As another example, the emotional state of a more experienced or more capable data center administrator may change from "happy" to "irritated" at the same workflow step due to feeling encumbered by too many incremental workflow steps or being provide too much unnecessary information. In this example, the workflow of the data center remediation operation may be adjusted to reduce the number of incremental steps to provide a higher-level, or more generalized, operational outline. Likewise, the UI for the data center remediation operation may be adjusted to reduce the amount of superfluous information the data center administrator already knows. Those of skill in the art will recognize that many such examples are possible. Accordingly, the foregoing is not intended to limit the spirit, scope, or intent of the invention.

In certain embodiments, the captured and collected steps of the data center remediation operation may then be processed to generate associated remediation documentation. In certain embodiments, the remediation documentation may be created manually by the data center personnel who performed the data center remediation operation, or automatically by the data center monitoring and management console 118, or the data center monitoring and management application 310 through 320, or a combination thereof. In certain embodiments, the resulting remediation documentation may be used to generate a new data center remediation operation.

In these embodiments, the method by which the steps of the data center remediation operation performed by the data center personnel are captured, and the method by which they are processed to generate new remediation documentation, is a matter of design choice. In certain embodiments, the resulting new remediation documentation may be used to generate a new data center remediation operation. In certain embodiments, the resulting remediation documentation, or the new data center remediation operation, or both, may be stored in the repository of remediation data 228. In various embodiments, the resulting remediation documentation, or the newly-generated data center remediation operation, or both, may be used in the remediation of certain data center issues in the future.

In various embodiments, remediation documentation pertinent to the data center personnel assigned to the remediation task 344 may be available. In certain of these embodiments, the pertinent remediation documentation may be processed to generate candidate data center remediation operations. In certain embodiments, the data center monitoring and management console 118, or the data center monitoring and management applications 310 through 320, or a combination thereof, may be implemented to generate the candidate data center remediation operations from the available and pertinent remediation documentation. In these embodiments, the method by which the available and pertinent remediation documentation is processed to generate the candidate data center remediation operations is a matter of design choice.

In certain embodiments, one or more of the resulting candidate data center remediation operations may be performed by the data center personnel assigned to remediate the data center issue. As before, in various embodiments, details of the selected data center remediation operation, and the emotional state of the administrator, is captured and collected at each step of the data center remediation operation as it is performed. In certain of these embodiments, the steps of the data center remediation operation may likewise be captured manually by the data center personnel who performed them, or captured automatically by the data center monitoring and management console 118, or the data center monitoring and management application 310 through 320, or a combination thereof. Likewise, in certain embodiments, the captured steps of the data center remediation operation may then be processed to generate updates to the available and pertinent remediation documentation. In certain embodiments, the remediation documentation may likewise be updated manually by the data center personnel who performed the data center remediation operation, or automatically by the data center monitoring and management console 118, or the data center monitoring and management application 310 through 320, or a combination thereof.

Likewise, as before, in these embodiments the method by which the steps of the data center remediation operation performed by the data center personnel are captured, and the method by which they are processed to update the available and pertinent remediation documentation, is a matter of design choice. In certain embodiments, the resulting updated remediation documentation may likewise be stored in the repository of remediation data 228. Likewise, in various embodiments, the resulting updated remediation documentation may be used in the performance of certain data center remediation operations in the future.

In certain embodiments, the collected emotional state data associated with a data center administrator while performing a particular data center remediation operation may be used to generate a revised priority value for a corresponding data center issue. In certain embodiments, the baseline priority level value originally assigned to the data center issue is replaced with the revised adjusted priority level value. In certain embodiments, the revised baseline priority level value assigned to the data center issue may be used in future data center remediation operations to reflect its priority.

In certain embodiments, the selected data center personnel may update the data center remediation operation notes upon completing the remediation task 344. In various embodiments, certain results and metrics associated with completion of the remediation task 344 may be collected, such as how long the remediation task 344 took to complete, whether any additional data center personnel or remediation resources 342 were required, issues encountered when performing the remediation task 344, whether it was successfully completed, and so forth. In certain embodiments, the collected results, metrics, and notes may then be added to a repository of data center remediation data 228.

Figure 4:
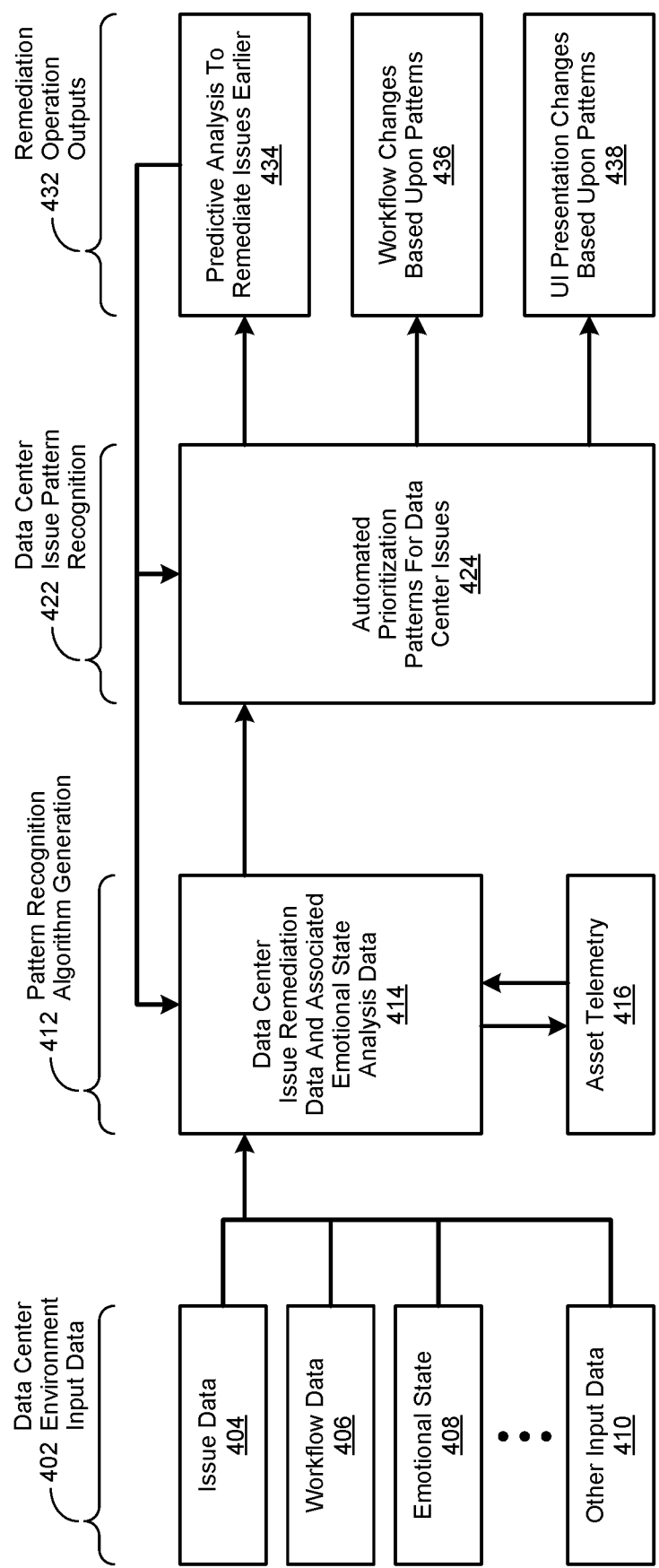
FIG. 4 is a simplified process flow diagram showing the performance of data center issue analysis and remediation operations.

FIG. 4 is a simplified process flow diagram showing the performance of data center issue analysis and remediation operations implemented in accordance with an embodiment of the invention to proactively adjust workflows and User Interfaces (UIs) to facilitate a data center remediation operation. In various embodiments, certain input data 402 associated with a data center monitoring and management environment, described in greater detail herein, may be used to generate a pattern recognition algorithm 412. In various embodiments, the resulting pattern recognition algorithm 412 may be used to recognize certain data center issue and data center remediation operation patterns 422. In various embodiments, the recognized patterns 422 may be used to generate certain outputs 432 that can be used to facilitate the performance of a data center remediation operation. In various embodiments, associated with certain data center remediation operation outputs 432 may be provided as feedback input for use in the generation of pattern recognition algorithms 412 and in the recognition of certain data center issue patterns 422.

In various embodiments, the data center monitoring and management environment input data may include certain data center issue data 404, data center workflow data 406, data center personnel emotional state data 408, and other input data 410, or a combination thereof. In various embodiments, certain data center issue remediation data, and certain emotional state data 414 associated with data center personnel performing a data center remediation operation may be used in the generation of a pattern recognition algorithm 412. In various embodiments, telemetry information 416 associated with one or more data center assets may be used in combination with the data center issue remediation data and emotional state data 414 associated with data center personnel performing a data center remediation operation in the generation of a pattern recognition algorithm 412.

In various embodiments, data center issue and data center remediation operation patterns 422 may be used to assist in automating the remediation of certain data center issues. In various embodiments, the data center remediation operation outputs 432 may be implemented to include certain predictive analyses to facilitate the remediation of data center issues more quickly. In various embodiments, the data center remediation operation outputs 432 may be implemented to include adjustments to a data center administrator's workflow, as described in greater detail herein, to facilitate their performance of a data center remediation operation. In various embodiments, the data center remediation operation outputs 432 may be implemented to include adjustments to a data center administrator's User Interface (UI), as likewise described in greater detail herein, to facilitate their performance of a data center remediation operation.

Figure 5:
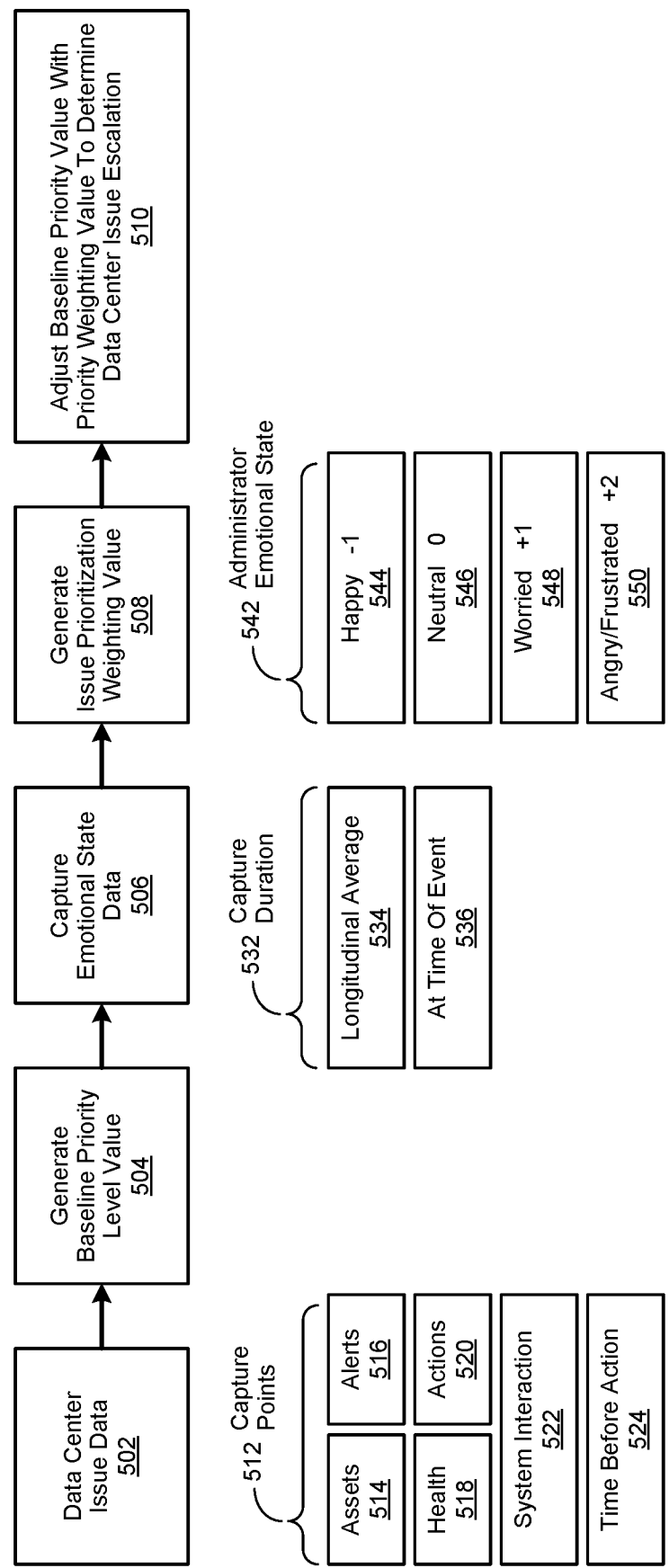
FIG. 5 is a simplified process flow diagram showing the adjustment of a data center issue baseline priority level value.
Figure 6A:
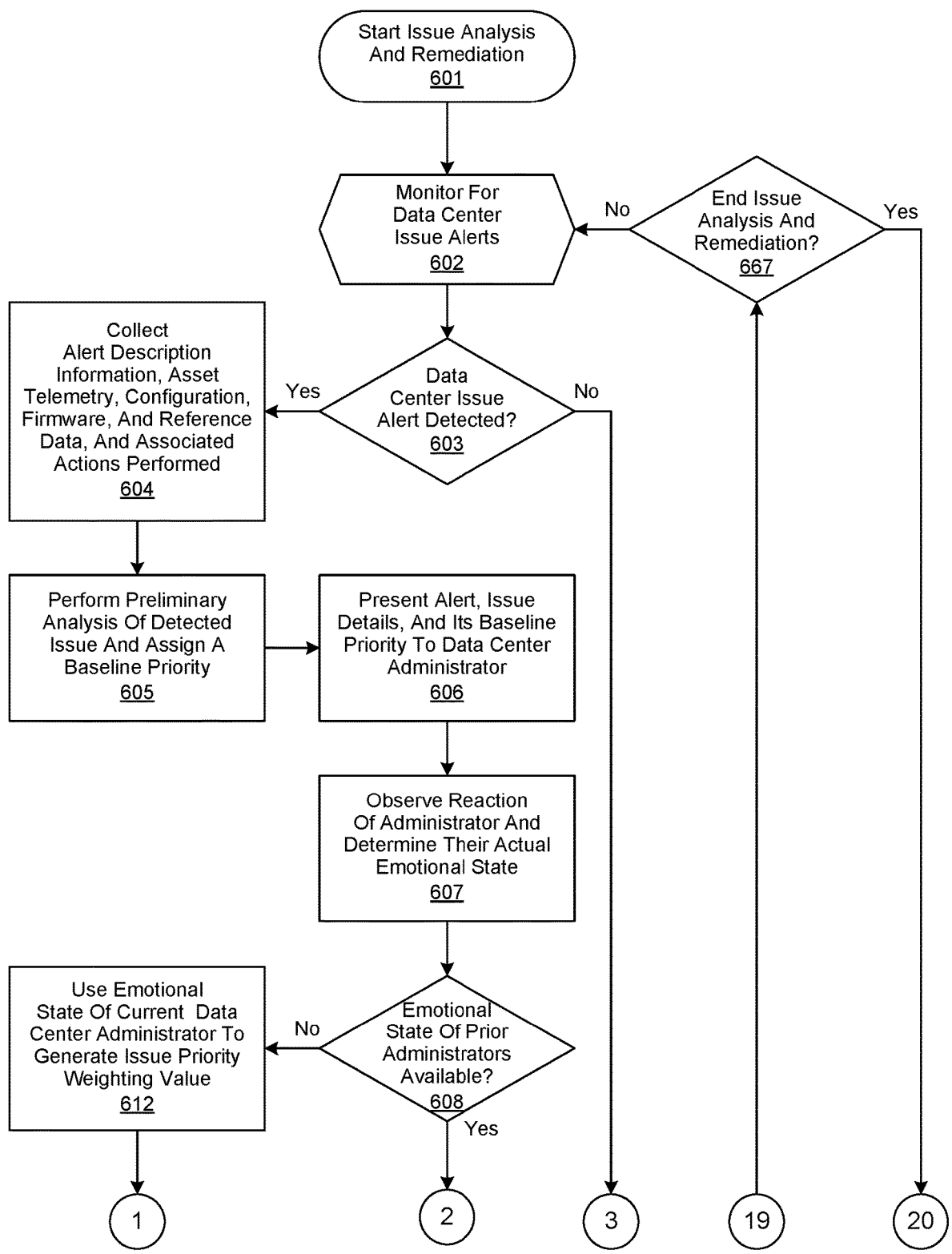
FIGS. 6a through 6g show a flowchart of the performance of data center data center issue analysis and remediation operations.
Figure 6B:
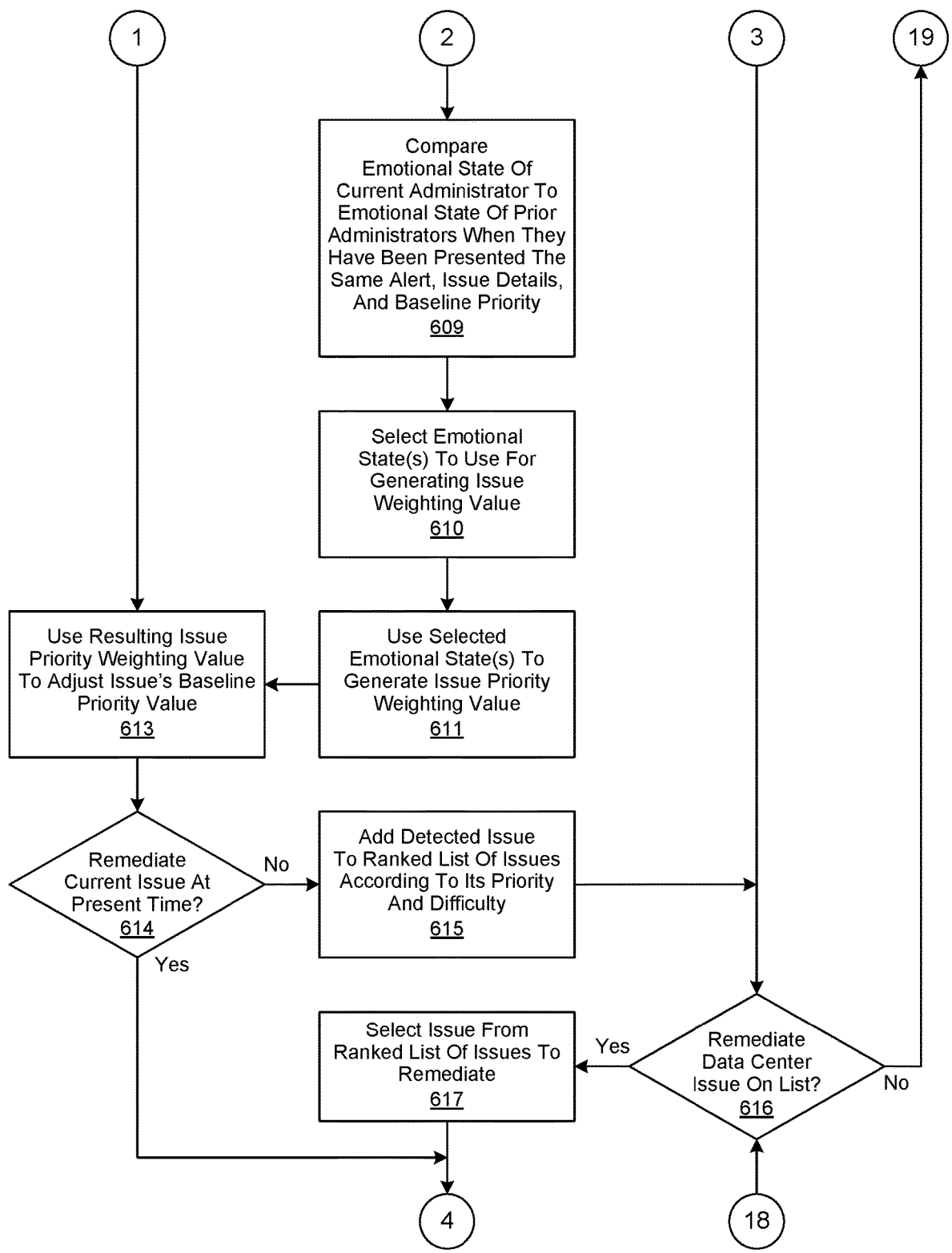
Figure 6C:
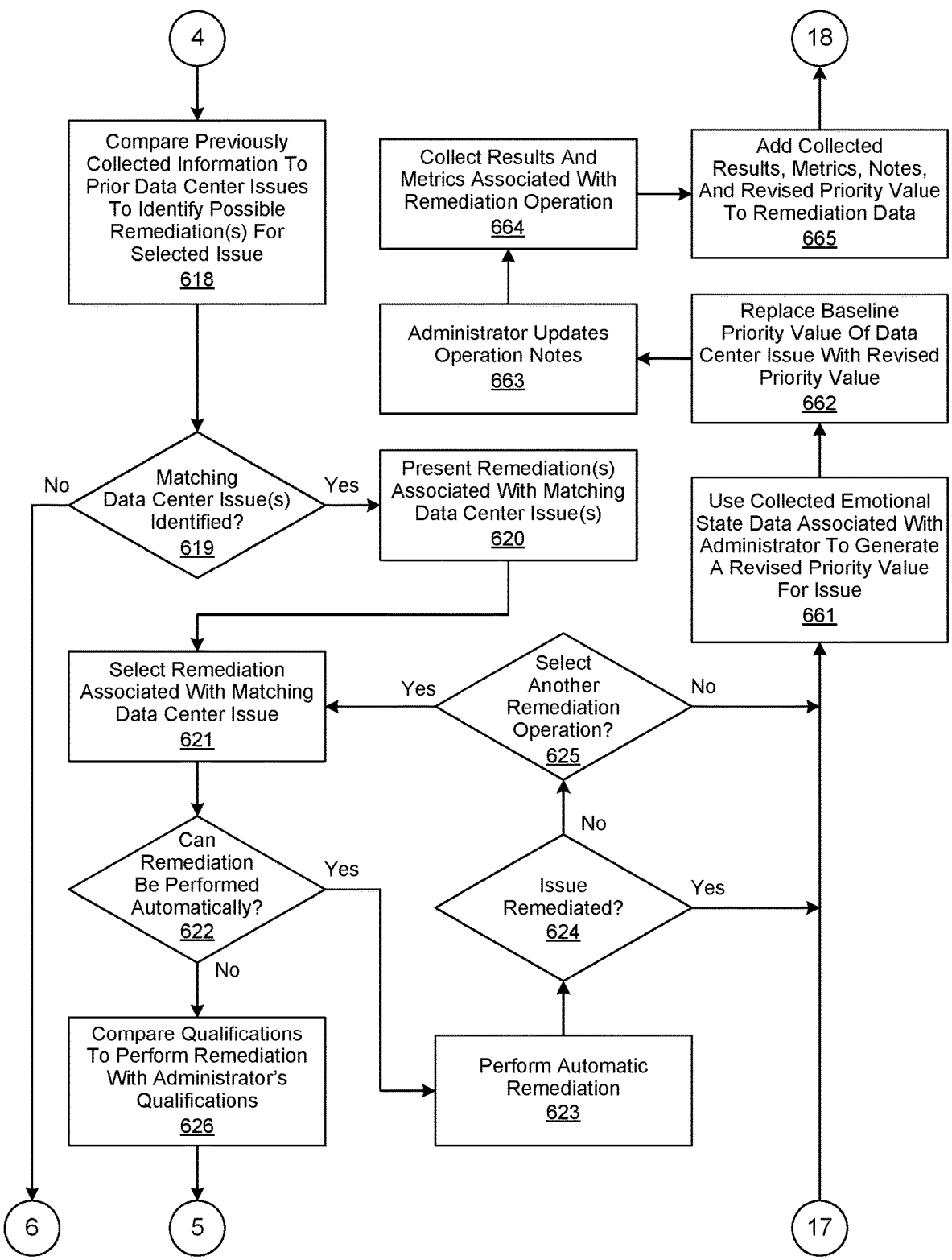
Figure 6D:
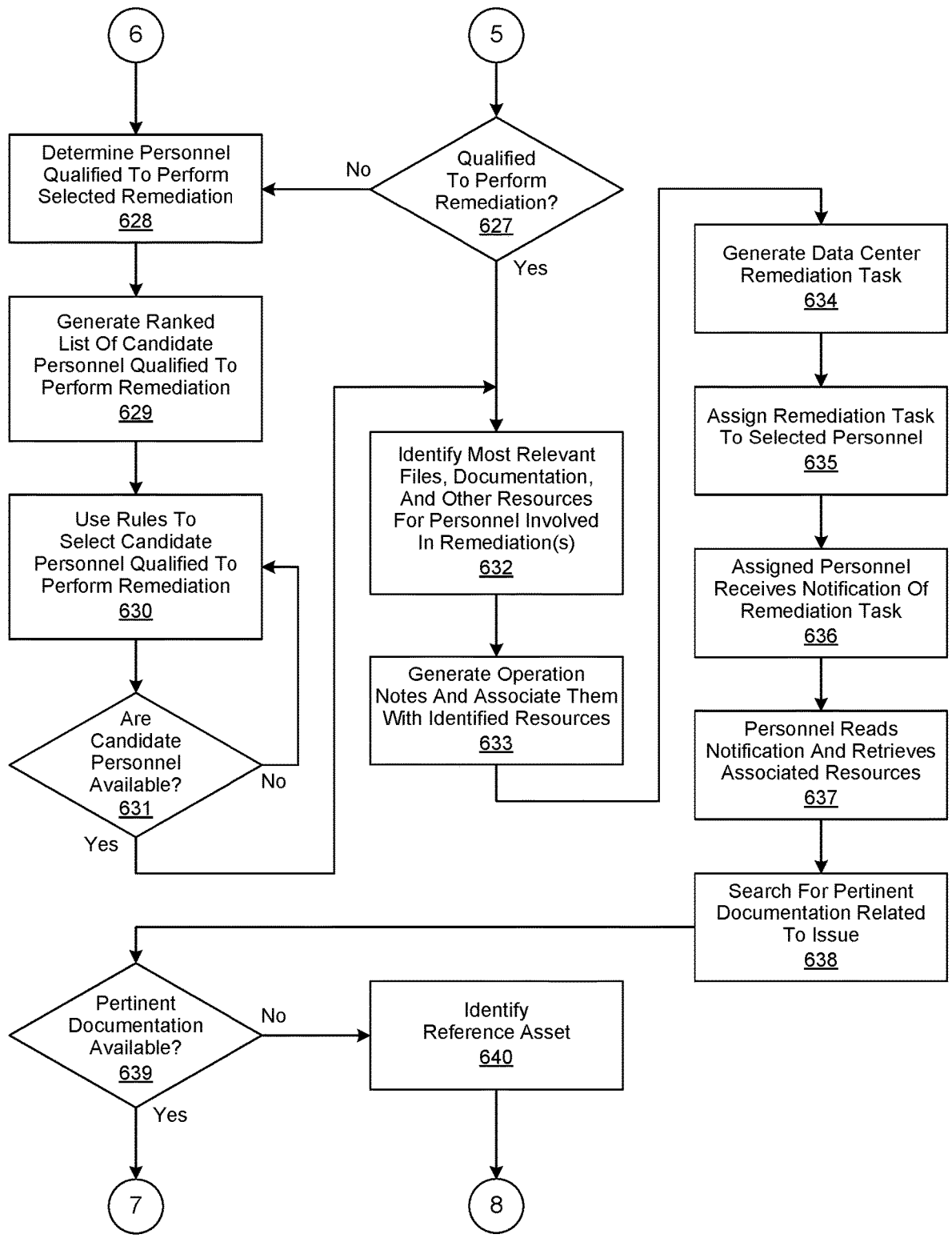
Figure 6E:
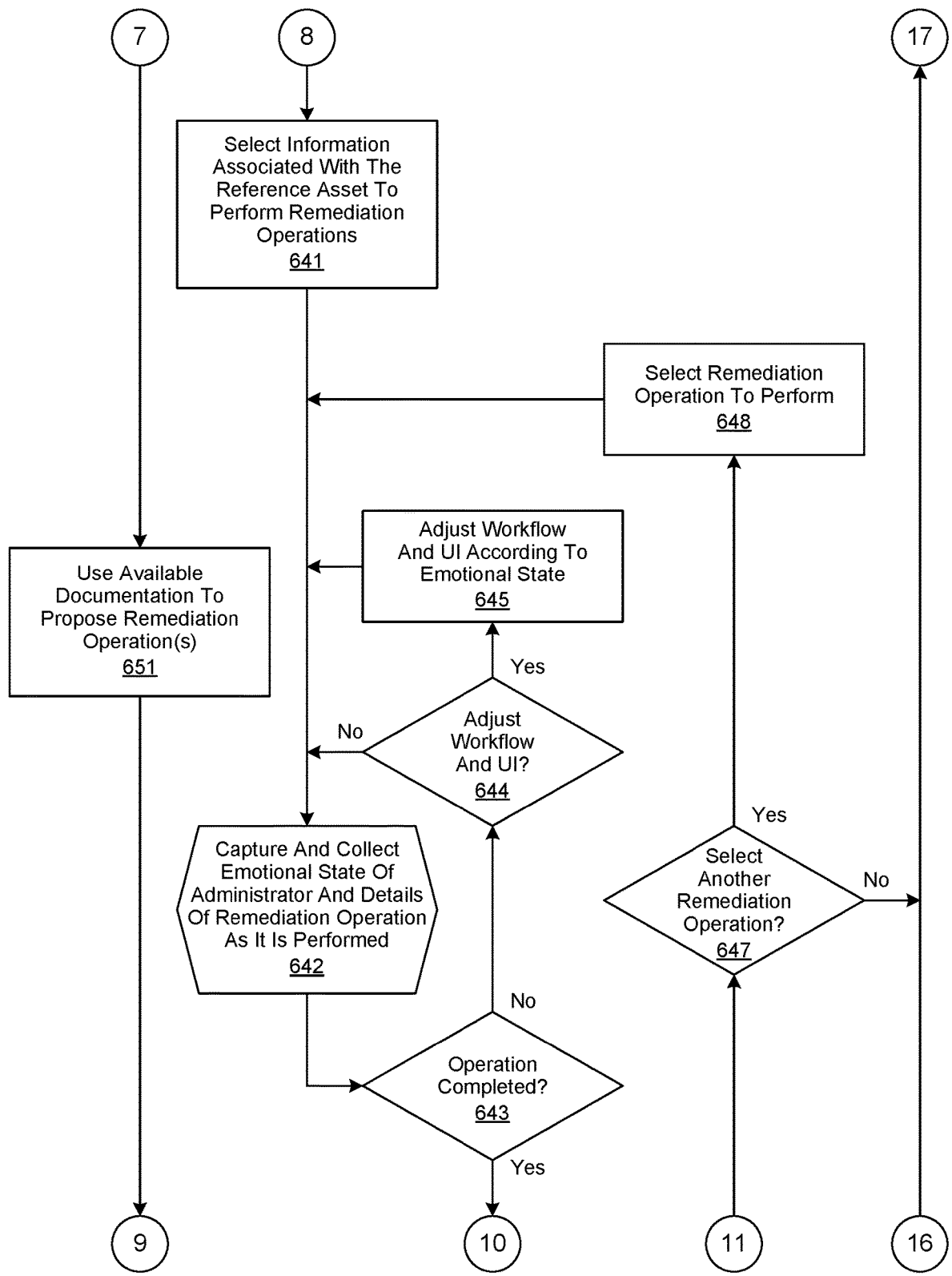
Figure 6F:
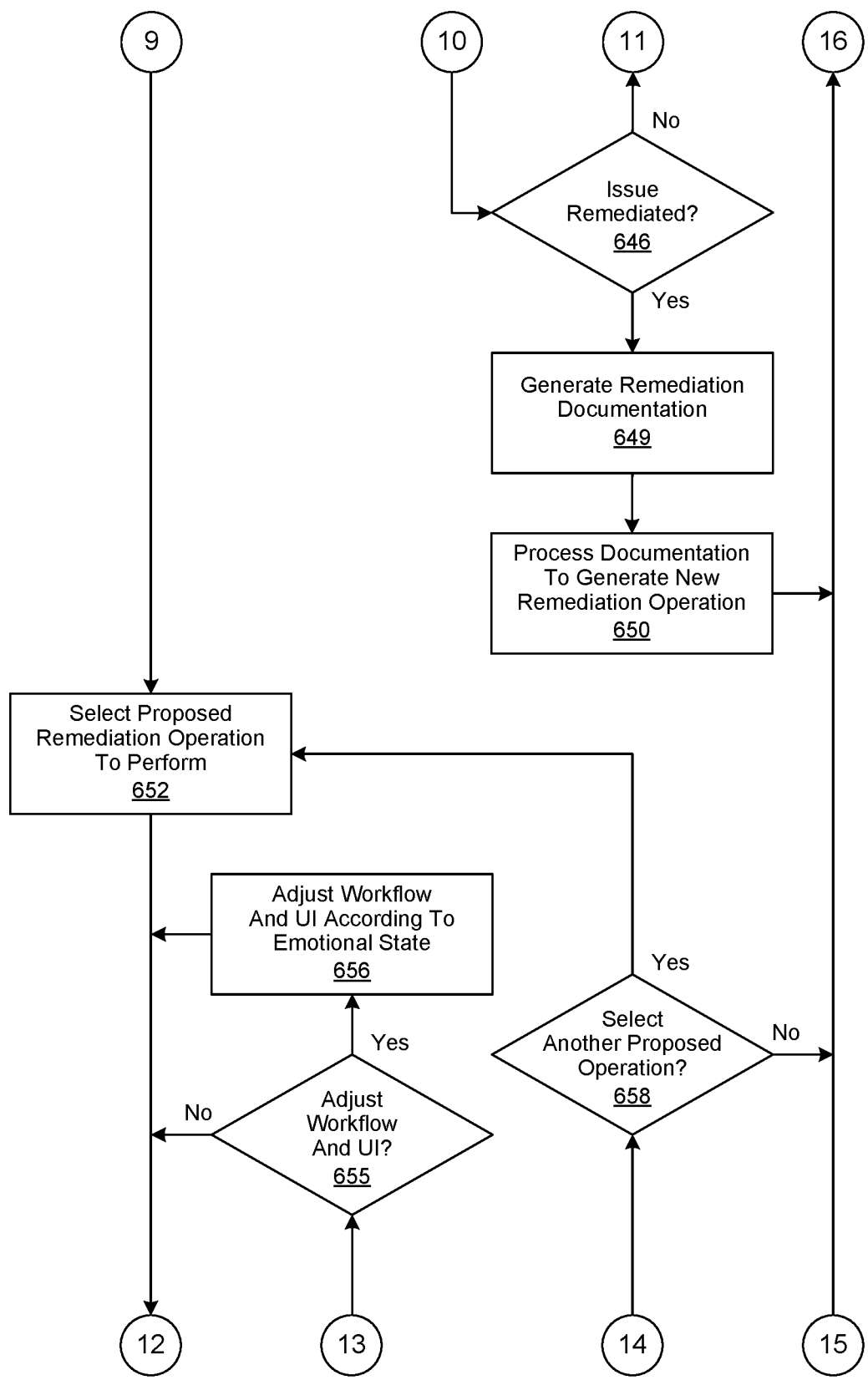
Figure 6G:
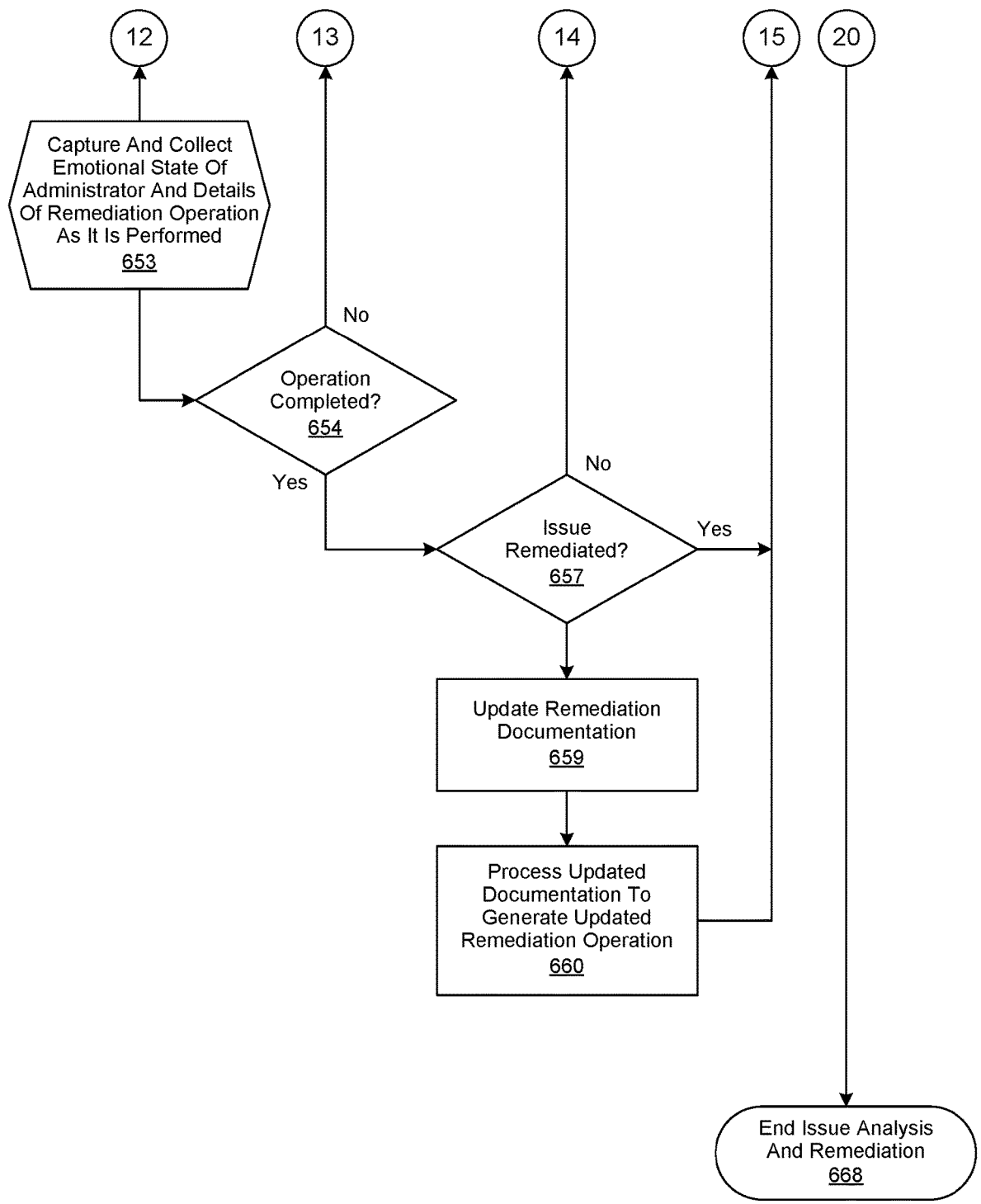

FIG. 5 is a simplified process flow diagram showing the adjustment of a data center issue baseline priority level value implemented in accordance with an embodiment of the invention. In various embodiments, as described in greater detail herein, certain data center issue data 502 may be used to generate a corresponding data center issue baseline priority level value 504, likewise described in greater detail herein. In various embodiments, as described in greater detail herein, certain emotional state data associated with a data center administrator, or other data center personnel, may be captured 506, and then used to generate a data center issue priority weighting value, likewise described in greater detail herein. In various embodiment, the resulting data center issue priority weighting value may be used to adjust a data center issue's associated baseline priority value, as described in greater detail herein, to determine whether its remediation should be escalated or de-escalated.

In various embodiments, the data center issue data 502 may be captured and collected a certain capture points 512. In various embodiments, such capture points 512 may include data associated with certain data center assets 514, certain data center issue alerts 516, the operating health 516 of such assets, certain data center actions 520 and system interactions 522 performed by data center personnel, the elapsed time 524 before such actions or interactions 522, or a combination thereof. In various embodiments, the emotional state data 506 may be captured during a particular capture duration 532. In certain of these embodiments, the capture duration 532 may include a longitudinal average 534, familiar to those of skill in the art, or at the time of a data center event's 536 occurrence, as described in greater detail herein.

In various embodiments, as described in greater detail herein, the characterization of the emotional state 542 of a data center administrator, or other data center personnel, is a matter of design choice. For example, in certain embodiments, the emotional state 542 may be characterized as "happy" 544, "neutral" 546, "worried" 548, or "angry/frustrated" 550. As likewise described in greater detail herein, in certain embodiments, a data center issue priority weighting value may be respectively assigned to each emotional state 542. As an example, the emotional states of "happy" 544, "neutral" 546, "worried" 548, and "angry/frustrated" 550 may respectively be assigned a data center issue priority weighting value of '−1,' '0,' '+1,' and '+2.'

FIGS. 6a through 6g show a flowchart of the performance of data center issue analysis and remediation operations implemented in accordance with an embodiment of the invention. In this embodiment, data center issue analysis and remediation operations are begun in step 601, followed by ongoing data center monitoring operations being performed in step 602 to detect data center issue alerts. A determination is then made in step 603 whether a data center issue alert has been detected.

If so, then data center issue alert description information, data center asset telemetry, configuration, firmware, and other reference information, and information related to the performance of certain associated data center actions that have been performed so far, is collected in step 604. A preliminary analysis of the detected issue is then performed in step 605 and it is assigned a baseline priority level value and a remediation difficulty value, such as '1,' '2,' '3,' '4,' and '5,' where a value of '1' is the highest priority and a value of '5' is the lowest.

In step 606, as described in greater detail herein, the data center issue alert, the previously-collected data center issue detail information, and its assigned baseline priority level value, is then presented to a data center administrator, or other data center personnel. Emotional information associated with the reaction of the data center administrator when viewing the presented information is then captured and processed in step 607, as described in greater detail herein, to determine their actual emotional state. A determination is then made in step 608 whether the emotional state of data center administrators who have previously received the same data center issue alert, associated data center issue details, and its corresponding data center issue priority level value, is available.

If so, then a comparison is performed in step 609 between the emotional state of the current data center administrator and the emotional states of other data center administrators at the time they received the same data center issue alert, associated data center issue details, and its corresponding data center issue priority level value. One or more of the emotional states are selected in step 610 and then used in step 611 to generate a data center issue priority weighting value. However, if it was determined in step 608 that the emotional state of prior data center administrators at the time they received the same data center issue alert, associated data center issue details, and its corresponding data center issue priority level value is not available, then the emotional state of the current data center administrator is used in step 613 to generate a data center issue priority weighting value. Thereafter, the resulting data center issue priority weighting value respectively generated in step 611 or step 612 is then used in step 613 to adjust the data center issue's baseline priority level value. In certain embodiments, application of the data center issue priority weighting value to the data center issue's baseline priority level value may escalate its prioritization, de-escalate its prioritization, or have no effect at all on its prioritization.

A determination is then made in step 614 whether to remediate the current data center issue at the present time. If not, then the current issue is then added to a ranked list of detected data center issues according to its adjusted priority level value and remediation difficulty value in step 615. Thereafter, or if it was determined in step 603 that a data center issue alert was not detected, then a determination is made in step 616 whether to remediate a data center issue listed on the ranked list of detected data center issues. If not, then a determination is made in step 667 whether to end data center issue analysis and remediation documentation operations. If not, then the process is continued, proceeding with step 602. Otherwise, data center issue analysis and remediation operations are ended in step 668.

However, if it was determined in step 616 to remediate a particular data center issue, then it is selected from the ranked list of data center issues in step 617. Thereafter, or if it was determined in step 614 to remediate the current data center issue at the present time, then the previously-collected information associated with the selected, or current, issue is then compared in step 618 to the same, or substantively similar, issues that have been remediated in the past to identify possible data center remediation operations to perform. A determination is then made in step 619 whether one or more matching data center issues have been identified. If so, then one or more data center remediation operations respectively associated with the one or more data center issues are presented to the administrator in step 620, as described in greater detail herein. In certain embodiments, the emotional state of the administrator may be used to determine which data center remediation operations are presented in step 620.

A data center remediation operation associated with the matching data center issues is then selected in step 621. A determination is then made in step 622 whether the data center remediation operation can be performed automatically. If so, then it is performed in step 623. A determination is then made in step 624 whether the data center issue has been remediated. If not, then a determination is made in step 625 whether to select another data center remediation operation. If so, then the process is continued, proceeding with step 621. Otherwise, or if it was determined in step 624 that the data center issue was remediated, then emotional state information associated with the data center administrator during performance of one or more data center remediation operations to remediate the data center issue is used in step 661 to generate a revised priority level value for it.

The resulting revised priority level value is then used in step 662 to replace the baseline priority level value associated with the data center issue. Thereafter, the administrator updates the data center remediation operation notes, described in greater detail herein, associated with the performance of any data center remediation operation in step 663. Then, in step 664, results of performing the data center remediation operation are collected, along with certain data center remediation operation metrics, likewise described in greater detail herein. The collected results, metrics, notes, and revised baseline priority level value for the data center issue are then added to a repository of data center remediation data in step 665. Thereafter, the process is continued, proceeding with step 616.

However, if it was determined in step 622 that the data center remediation operation selected in step 616 cannot be performed automatically, then the qualifications typically associated with performing the selected data center remediation operation is compared to the administrator's qualifications to do so in step 626. A determination is then made in step 627 whether the data center administrator possesses the qualifications typically associated with performing the selected data center remediation operation. If not, then candidate data center personnel qualified to perform the selected data center remediation operation is determined in step 627.

A ranked list of candidate data center personnel to perform the selected data center remediation operations is then generated in step 629, as described in greater detail herein. Rules are then used in step 630, as likewise described in greater detail herein, to select candidate data center personnel to performing the selected data center remediation operation. A determination is then made in step 631 whether the selected candidate personnel are available. If not, then the process is continued, proceeding with step 630.

Otherwise, or if it was determined in step 627 that the administrator possesses the qualifications typically associated with performing the selected data center remediation operation, then the most pertinent remediation documentation, data center asset files, and other remediation resources, for the administrator and any data center personnel selected to be involved in performing the selected data center remediation operation is identified in step 632. Thereafter, data center remediation operation notes, described in greater detail herein, are prepared in step 633 and associated with the previously-identified remediation resources needed to perform the selected data center remediation operation. The data center remediation operation notes, and associated remediation resources, are then processed in step 634 to generate a data center remediation operation task. The resulting data center remediation operation task is then assigned in step 635 to the administrator and any data center personnel who may have been previously selected to perform the selected data center remediation operations.

The administrator and any previously-assigned data center personnel then receive notification of the data center remediation operation task in step 636. Then, in step 637, the administrator and any previously-assigned data center personnel reads the notification, and its associated data center remediation task and data center remediation operation notes, and retrieves any associated remediation resources, including remediation documentation, they may wish to use to perform the selected data center remediation operation. A search for remediation documentation most pertinent to the data center personnel assigned to remediate the data center issue is then performed in step 638.

A determination is then made in step 639 whether pertinent documentation is available to perform the selected data center remediation operation. If not, a reference data center asset, described in greater detail herein, is identified in step 640. Information associated with the reference data center asset is then selected in step 641 to perform the selected data center remediation operation to remediate the data center issue.

A data center remediation operation to perform is then selected in step 642. Thereafter, details of the selected data center remediation operation, and the emotional state of the administrator, is captured and collected at each step of the data center remediation operation is performed in step 642. A determination is then made in step 643 whether the data center remediation operation has been completed. If not, then a determination is made in step 644 whether to adjust the workflow of the data center remediation operation, or its User Interface (UI), or both, according to the current emotional state of the data center administrator. If not, then the process is continued, proceeding with step 642. Otherwise, the workflow of the data center remediation operation, or its UI, or both, is adjusted according to the current emotional state of the data center administrator in step 645 and the process is continued, proceeding with step 642.

However, if it was determined in step 643 that the current data center remediation operation has been completed, then a determination is made in step 646 whether performance of the data center remediation operation has resulted in the data center issue being remediated. If not, then a determination is made in step 647 whether to select another data center remediation operation to perform. If so, then a data center remediation operation to perform is selected in step 648, and the process is continued, proceeding with step 642. However, if it was determined in step 646 that the data center issue was remediated, then data center remediation documentation associated with remediating the data center issue is generated in step 649. The resulting remediation documentation is then used in step 650 to generate a new data center remediation operation. Thereafter, or if it was determined in step 647 not to select another data center remediation operation to perform, the process is continued, proceeding with step 661.

However, if it was determined in step 639 that pertinent remediation documentation was available, then it is used to step 651 to propose one or more candidate data center remediation operations. A proposed data center remediation operation to perform is then selected in step 652. Thereafter, details of the selected data center remediation operation, and the emotional state of the administrator, is captured and collected at each step of the data center remediation operation as it is performed in step 653.

A determination is then made in step 654 whether the data center remediation operation has been completed. If not, then a determination is made in step 655 whether to adjust the workflow of the data center remediation operation, or its User Interface (UI), or both, according to the current emotional state of the data center administrator. If not, then the process is continued, proceeding with step 653. Otherwise, the workflow of the data center remediation operation, or its UI, or both, is adjusted according to the current emotional state of the data center administrator in step 656 and the process is continued, proceeding with step 653.

However, if it was determined in step 654 that the current data center remediation operation has been completed, then a determination is then made in step 651 whether performance of the data center remediation operation has resulted in the data center issue being remediated. If not, then a determination is made in step 658 whether to select another proposed data center remediation operation. If so, then the process is continued, proceeding with step 652. However, if it was determined in step 651 that the data center issue was remediated, then remediation documentation associated with remediating the data center issue is updated in step 659. The resulting updated remediation documentation is then used in step 660 to generate updates to the data center remediation operation. Thereafter, or if it was determined in step 657 not to select another data center remediation operation to perform, then the process is continued, proceeding with step 661.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    monitoring data center assets within a data center;
    identifying an issue within the data center, the issue being associated with an operational situation associated with a particular component of the data center;
    notifying an administrator of the issue within the data center;
    tracking administrator reactions based upon the notifying, the tracking being performed by a camera associated with a user device of the administrator, the tracking capturing visually-oriented emotional information of the administrator;
    performing an affective computing operation based upon the visually-oriented emotional information, the affective computing operation determining an emotional state of the administrator;
    identifying a remediation task, the remediation task being designed to address the issue within the data center, the identifying being based upon at least some of the administrator reactions and the emotional state of the administrator;
    prioritizing the remediation task based upon the administrator reactions to the notifying and the emotional state of the administrator and,
    comparing previously collected information regarding prior data center issues to identify a plurality of possible remediation tasks for the issue; and wherein
    the administrator reactions comprise micro expressions;
    the remediation task is proactively prioritized based upon the micro expressions;
    micro expressions of the administrator are compared with micro expressions of other administrators when proactively prioritizing the remediation task;
    the identifying the remediation task includes selecting the remediation task from the plurality of possible remediation tasks for the issue.

2. The method of claim 1, wherein:
    tracking the administrator reactions comprise analysis of a current workflow of the administrator when reacting to the notifying the administrator of the issue.

3. The method of claim 1, further comprising:
    performing a pattern recognition operation, the pattern recognition operation providing prioritization patterns for issues and assets; and,
    updating a management console user interface based upon the prioritization patterns.

4. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        monitoring data center assets within a data center;
        identifying an issue within the data center, the issue being associated with an operational situation associated with a particular component of the data center;
        notifying an administrator of the issue within the data center;
        tracking administrator reactions based upon the notifying, the tracking being performed by a camera associated with a user device of the administrator, the tracking capturing visually-oriented emotional information of the administrator;

performing an affective computing operation based upon the visually-oriented emotional information, the affective computing operation determining an emotional state of the administrator;

identifying a remediation task, the remediation task being designed to address the issue within the data center, the identifying being based upon at least some of the administrator reactions and the emotional state of the administrator;

prioritizing the remediation task based upon the administrator reactions to the notifying and the emotional state of the administrator;

comparing previously collected information regarding prior data center issues to identify a plurality of possible remediation tasks for the issue; and wherein the administrator reactions comprise micro expressions;

the remediation task is proactively prioritized based upon the micro expressions;

micro expressions of the administrator are compared with micro expressions of other administrators when proactively prioritizing the remediation task;

the identifying the remediation task includes selecting the remediation task from the plurality of possible remediation tasks for the issue.

5. The system of claim 4, wherein:
tracking the administrator reactions comprise analysis of a current workflow of the administrator when reacting to the notifying the administrator of the issue.

6. The system of claim 4, wherein the instructions executable by the processor are further configured for:
performing a pattern recognition operation, the pattern recognition operation providing prioritization patterns for issues and assets; and,
updating a management console user interface based upon the prioritization patterns.

7. A non-transitory, computer-readable storage medium embodying computer program code, the computer program code comprising computer executable instructions configured for:
monitoring data center assets within a data center;
identifying an issue within the data center, the issue being associated with an operational situation associated with a particular component of the data center;
notifying an administrator of the issue within the data center;
tracking administrator reactions based upon the notifying, the tracking being performed by a camera associated with a user device of the administrator, the tracking capturing visually-oriented emotional information of the administrator;

performing an affective computing operation based upon the visually-oriented emotional information, the affective computing operation determining an emotional state of the administrator;

identifying a remediation task, the remediation task being designed to address the issue within the data center, the identifying being based upon at least some of the administrator reactions and the emotional state of the administrator;

prioritizing the remediation task based upon the administrator reactions to the notifying and the emotional state of the administrator; and, comparing previously collected information regarding prior data center issues to identify a plurality of possible remediation tasks for the issue; and wherein the administrator reactions comprise micro expressions;

the remediation task is proactively prioritized based upon the micro expressions;

micro expressions of the administrator are compared with micro expressions of other administrators when proactively prioritizing the remediation task;

the identifying the remediation task includes selecting the remediation task from the plurality of possible remediation tasks for the issue.

8. The non-transitory, computer-readable storage medium of claim 7, wherein:
tracking the administrator reactions comprise analysis of a current workflow of the administrator when reacting to the notifying the administrator of the issue.

9. The non-transitory, computer-readable storage medium of claim 7, wherein the computer executable instructions are further configured for:
performing a pattern recognition operation, the pattern recognition operation providing prioritization patterns for issues and assets; and,
updating a management console user interface based upon the prioritization patterns.

10. The non-transitory, computer-readable storage medium of claim 7, wherein:
the computer executable instructions are deployable to a client system from a server system at a remote location.

11. The non-transitory, computer-readable storage medium of claim 7, wherein:
the computer executable instructions are provided by a service provider to a user on an on-demand basis.

* * * * *